(12) United States Patent
Gera et al.

(10) Patent No.: US 8,566,514 B2
(45) Date of Patent: *Oct. 22, 2013

(54) TECHNIQUES TO TRUNCATE DATA FILES IN NONVOLATILE MEMORY

(75) Inventors: Swati Gera, Folsom, CA (US); Karey Hart, Orangevale, CA (US); Neil Gabriel, Folsom, CA (US); Lawrence Chang, Rancho Cordova, CA (US); Patrick McGinty, Rancho Cordova, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/177,995

(22) Filed: Jul. 7, 2011

(65) Prior Publication Data

US 2012/0179857 A1 Jul. 12, 2012

Related U.S. Application Data

(63) Continuation of application No. 11/394,923, filed on Mar. 31, 2006, now Pat. No. 7,979,624.

(51) Int. Cl.
*G06F 12/00* (2006.01)
*H01L 35/00* (2006.01)
*H04B 1/38* (2006.01)
*H04B 1/02* (2006.01)

(52) U.S. Cl.
USPC ...... 711/103; 340/5.61; 340/5.64; 343/700 R; 370/913; 711/171; 711/172; 711/159

(58) Field of Classification Search
USPC ............ 711/103, 171, 172; 343/700 R; 340/5.61, 5.64; 370/913
See application file for complete search history.

(56) References Cited

U.S. PATENT DOCUMENTS

| 5,592,669 | A | * | 1/1997 | Robinson et al. ............... 1/1 |
| 5,630,093 | A | * | 5/1997 | Holzhammer et al. ........ 711/115 |
| 5,822,562 | A | * | 10/1998 | Dahlen et al. ................ 711/170 |
| 5,930,815 | A | * | 7/1999 | Estakhri et al. .............. 711/103 |
| 5,987,478 | A | * | 11/1999 | See et al. ........................ 1/1 |
| 7,472,309 | B2 | * | 12/2008 | Bangalore ..................... 714/21 |
| 2003/0009538 | A1 | * | 1/2003 | Shah et al. ................... 709/219 |
| 2005/0144358 | A1 | * | 6/2005 | Conley et al. ............... 711/103 |
| 2007/0233752 | A1 | * | 10/2007 | Bangalore et al. ........... 707/202 |

OTHER PUBLICATIONS

Office action, Jun. 24, 2009, U.S. Appl. No. 11/395,982, 19 pages.*

* cited by examiner

*Primary Examiner* — Reginald Bragdon
*Assistant Examiner* — Mehdi Namazi
(74) *Attorney, Agent, or Firm* — Kacvinsky Daisak PLLC

(57) ABSTRACT

Various embodiments for performing truncate operations in nonvolatile memory are described. In one embodiment, an apparatus may include a nonvolatile memory to perform one or more truncate operations on a data file written to the nonvolatile memory and a volatile memory to track a truncate operation performed in the nonvolatile memory. Other embodiments are described and claimed.

20 Claims, 6 Drawing Sheets

TECHNIQUES TO TRUNCATE DATA FILES IN NONVOLATILE MEMORY

RELATED CASE

This application is a Continuation of commonly owned U.S. patent application Ser. No. 11/394,923 titled "Techniques to Truncate Data Files in Nonvolatile Memory" filed Mar. 31, 2006, now U.S. Pat. No. 7,979,624, which is hereby incorporated by reference in its entirety.

BACKGROUND

Nonvolatile memory, such as flash memory, is capable of retaining digital information until erased. Some flash memory products may perform power-loss recovery (PLR) operations to identify invalid data generated by the loss of power to the flash memory and reclaim operations to recover flash memory space consumed by invalid data. The reclaim operations generally may involve targeting a flash block containing invalid data, copying any valid data in the targeted flash block to a separate memory location, and then erasing the targeted flash block to recover the flash memory space.

Current methods for performing PLR and reclaim operations may require the ability to go back to previously programmed areas of the flash memory. For example, erasing flash memory to reclaim space may involve a process known as "bit-twiddling" in which certain bits are altered in the header of a flash block to indicate the progress of file system operations during reclaim. Moving forward, however, flash memory may enforce a sequential addressing requirement that restricts the ability to go back to previously programmed flash blocks. Therefore, there is a need for improved techniques to perform operations in flash memory under sequential addressing restrictions while satisfying PLR requirements of the file system.

DETAILED DESCRIPTION

Various embodiments are directed to performing truncate operations in nonvolatile memory, such as flash memory. In one embodiment, a data file may be written to a file system in nonvolatile memory and one or more truncate operations may be performed to reduce the size of the data file. Valid data and a truncate object written to the nonvolatile memory may be tracked in a volatile memory, such as random-access memory (RAM). In various implementations, only the most recent truncate object is tracked in the volatile memory. In some cases, the volatile memory may be arranged to track invalidated data so that when all invalidated data has been removed from the nonvolatile memory, a truncate object in the nonvolatile memory may be reclaimed.

In various embodiments, the nonvolatile memory may enforce a sequential addressing requirement that restricts the ability to go back to previously programmed areas of the nonvolatile memory. In such embodiments, however, truncate operations may be performed and tracked while complying with sequential addressing restrictions and avoiding bit-twiddling. It can be appreciated that during PLR operations, a file system is able to recover by tracking only the most recent truncate operation.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Figure 1:
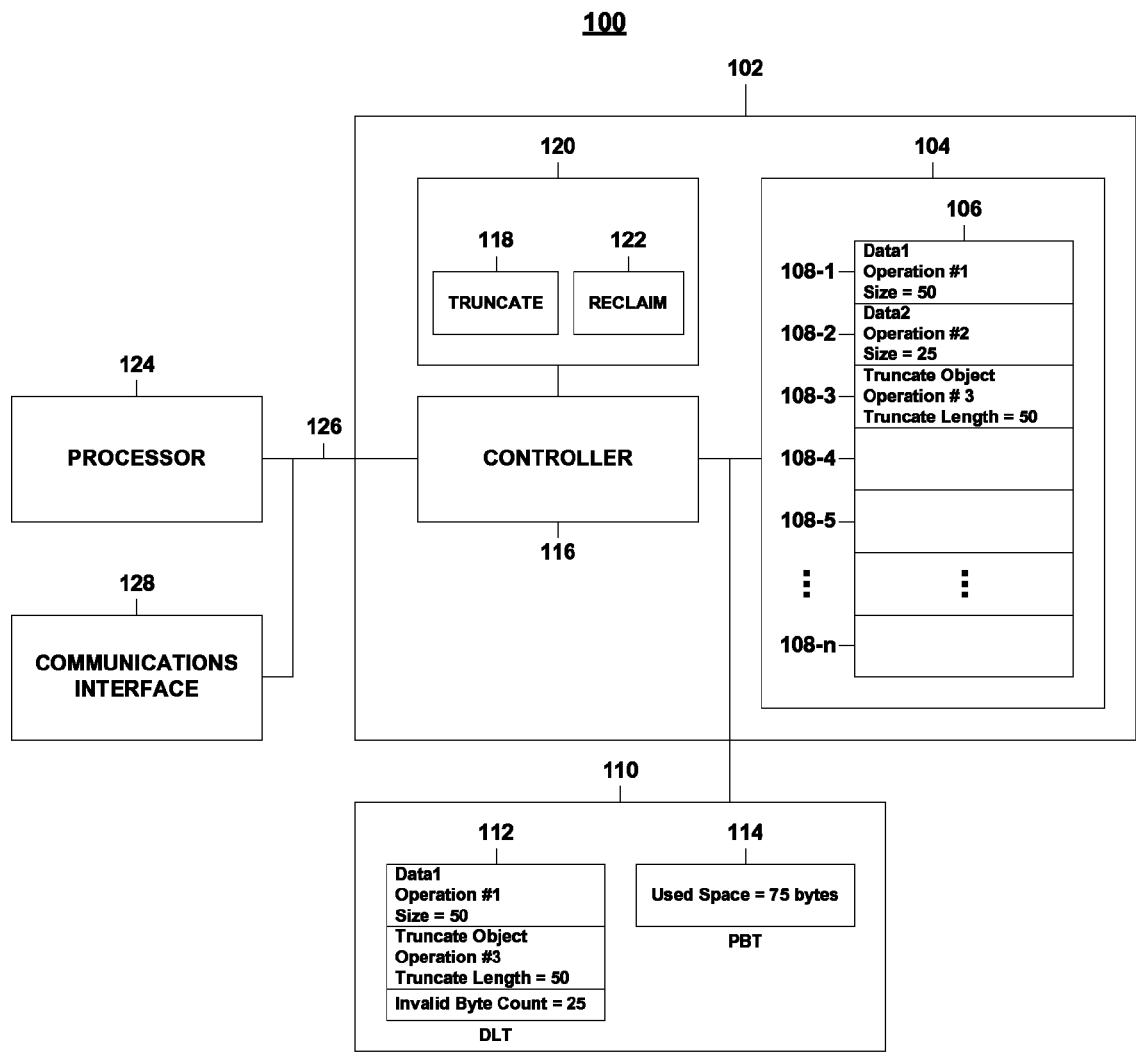
FIG. 1 illustrates one embodiment of a computing system.

FIG. 1 illustrates a block diagram of one embodiment of a computing system 100. The computing system 100 generally may comprise various physical or logical components implemented as hardware, software, or any combination thereof, as desired for a given set of design parameters or performance constraints.

In various embodiments, the computing system 100 may comprise or be implemented by a wireless device such as a mobile telephone, a handheld computer, a personal digital assistant (PDA), a combination mobile telephone/PDA, a handset, a one-way pager, a two-way pager, a data transmission device, a wireless access point, a base station (BS), a subscriber station (SS), a mobile subscriber center (MSC), a radio network controller (RNC), and so forth. In such embodiments, the computing system 100 may comprise one more interfaces and/or components for wireless communication, such as one or more antennas, transmitters, receivers, transceivers, amplifiers, filters, control logic, and so forth.

Although some embodiments may be described with the computing system 100 implemented as a wireless device by way of example, it may be appreciated that the embodiments are not limited in this context. For example, in some embodiments, the computing system 100 may comprise, or be implemented as a personal computer (PC), a desktop computer, a laptop computer, a notebook PC, a workstation, a terminal, a server, an appliance, a PDA, a digital music player, a set-top box (STB), or other type of computer system or sub-system.

The computing system 100 may comprise a nonvolatile memory 102. The nonvolatile memory 102 may comprise, for example, one or more chips or integrated circuits (ICs). In various embodiments, the nonvolatile 102 may be implemented by flash memory, such as a NAND or a NOR flash memory. Examples of flash memory include, for example, Intel® Flash Memory products, such as StrataFlash® Cellular Memory and Intel® Wireless Flash Memory, and other types of flash memory. It can be appreciated that although some embodiments may be described with the nonvolatile memory 102 implemented by flash memory, the embodiments are not limited in this context. For example, the nonvolatile memory 102 may be implemented by polymer memory, ferroelectric memory, magnetic memory, or other nonvolatile storage medium.

The nonvolatile memory 102 may be arranged to store various types of information such as data, instructions, and code. The information may include, for example, image information (e.g., digital photographs, user interfaces, Web pages, graphics), audio information (e.g., music, sounds, ring tones), video information, audio/video (A/V) information (e.g., video files, video clips, movies, broadcast programming), voice information, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The information may include command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth. In various embodiments, instructions and/or code may be stored contiguously in the nonvolatile memory 102 to allow the instructions and/or code to be executed-in-place (XIP). The embodiments are not limited in this context.

The information stored by the nonvolatile memory 102 may comprise static and/or dynamic information. Static information may comprise any information that may not be altered, changed or updated. Examples of static information may include read-only data, instructions, and code. Dynamic information may comprise any information that may be altered, changed, and/or updated. Examples of dynamic information may include read/write data, instructions, and code. The embodiments are not limited in this context.

The nonvolatile memory 102 may be arranged to store information in a file system. In various embodiments, the file system may comprise one or more nonvolatile memory arrays, such as nonvolatile memory array 104. The nonvolatile memory array 104 may be implemented, for example, by an array of floating gate transistors or nonvolatile memory cells (e.g., flash memory cells). The nonvolatile memory cells may comprise single-bit cells that allow one bit of information to be stored in each cell and/or multi-level cells that allow more than one bit of information to be stored in each cell. For example, two bits of information may be stored in a multi-level cell by controlling programming and reading in order to have four states within a single transistor.

The nonvolatile memory array 104 may comprise a plurality of nonvolatile memory blocks to store information, such as nonvolatile memory block 106. In various implementations, the nonvolatile memory array 104 may be arranged to have a symmetrical or asymmetrical blocking architecture. For example, the nonvolatile memory array 104 may comprise a symmetrically-blocked array with each nonvolatile memory block having a size of 256 kilobytes (KB). In some embodiments, nonvolatile memory blocks may be grouped into partitions (e.g., 16 or 32 memory blocks per partition) within the nonvolatile memory array 104. In some cases, the nonvolatile memory 102 may be arranged to store data and code in separate partitions. The embodiments are not limited in this context.

In various embodiments, the nonvolatile memory block 106 may be divided into a plurality of regions. As shown in FIG. 1, for example, the nonvolatile memory block 106 may comprise regions 108-1-*n*, where n represents any positive integer value (e.g., n=256). Each of the regions 108-1-*n* may comprise a plurality of nonvolatile memory cells (e.g., flash memory cells) to store information.

In some implementations, the regions 108-1-*n* may be programmed in one or more modes, such as an object mode or a control mode. A region programmed in object mode may be configured, for example, as a one-time write or write-restricted area for storing static information, such as objects or payloads that rarely change. A region programmed in control mode may be configured, for example, as a rewritable area that supports multiple programming operations for writing, erasing, rewriting, over-writing, augmenting, altering, changing, and/or updating dynamic information. In some cases, the full data storage capacity (e.g., 1 KB) of a region may be available for data storage. In other cases, less than the full data storage capacity (e.g., 512 bytes) of a region may be available for data storage.

The nonvolatile memory 102 may be arranged to read and write data files to and from a file system. In some cases, the file system may comprise a multithreaded file system. In various embodiments, the file system may be arranged to divide larger data files into smaller data fragments. The data fragments of a data file may be written, for example, to regions of one or more nonvolatile memory blocks. The data fragments may be stored in regions within a nonvolatile memory block and/or in regions across multiple nonvolatile memory blocks. The regions containing the data fragments may be linked together to integrate the data fragments of a data file. In various implementations, the file system may allow appending to a data file and/or editing a data file from any location in the file.

In various embodiments, the nonvolatile memory 102 may be arranged to write data fragments of a data file to the nonvolatile memory block 106 within the nonvolatile memory array 104. As shown in FIG. 1, for example, a first data fragment (Data1) having a size of 50 bytes is written to a first region 108-1 of the nonvolatile memory block 106 by a first operation (Operation #1). A second data fragment (Data2) having a size of 25 bytes is written to a second region 108-2 of the nonvolatile memory block 106 by a second operation (Operation #2). Although not shown, a header may be written to the nonvolatile memory block 106 for each data write.

The nonvolatile memory 102 may be arranged to perform a truncate operation on a data file to decrease the file size. In various embodiments, the truncate operation may comprise invalidating data fragments or portions of data fragments to reduce the size of a data file to a desired size. In some cases, the data to be invalidated comprises information that is no longer useful, and the truncate operation is employed to ensure that data is invalidated correctly.

The truncate operation may comprise writing a truncate object to the nonvolatile memory 102. The truncate object may comprise information including file identification, object type, an edit or operation number for the particular file, and a truncate length indicating the desired length of the file after the truncate operation, for example. In various implementations, the truncate operation may reduce the size of the data file to a desired size by invalidating any data in excess of the truncate length.

In various embodiments, the nonvolatile memory 102 may be arranged to perform a reclaim operation to recover nonvolatile memory space consumed by invalid data. In some cases, the reclaim operation may require erasing to be performed at block granularity. For example, when space consumed by invalid data is needed for new allocations, the nonvolatile memory block 106 may be targeted for reclaim. In various implementations, the reclaim operations may be triggered when an amount of consumed nonvolatile memory space exceeds a certain threshold (background reclaim) and/or when additional nonvolatile memory space is required (foreground reclaim).

In some cases, the nonvolatile memory block 106 may contain both invalid data and valid data. In such cases, valid information may be relocated to a separate memory location, such as a spare nonvolatile memory block, before the nonvolatile memory block 106 is erased. This ensures that valid information remains intact in the event that power is lost or interrupted.

Referring to the embodiment of FIG. 1, a truncate object having a truncate length of 50 bytes is written to the third region 108-3 of the nonvolatile memory block 106 by a third operation (Operation #3). The first data fragment (Data1) having a size of 50 bytes is retained as valid data. The second data fragment (Data2) having a size of 25 bytes, however, is invalidated by the truncate operation. In this embodiment, the second data fragment (Data2) may be marked invalid but not yet reclaimed.

In various embodiments, a truncate object written to the nonvolatile memory 102 may be tracked in a volatile memory 110. The volatile memory 110 may comprise, for example, one or more chips or integrated circuits ICs and may be implemented by RAM, such as static RAM (SRAM), dynamic RAM (DRAM), Double-Data-Rate DRAM (DDRAM), and/or synchronous DRAM (SDRAM). The embodiments are not limited in this context.

The volatile memory 110 may comprise one or more data structures, such as a dynamic link table (DLT) 112 and a physical block table (PBT) 114 to store information associated with one or more truncate operations. In various embodiments, when a truncate object is written to the nonvolatile memory 102, the truncate object is tracked in the DLT 112 of the volatile memory 110. In such embodiments, the DLT 112 may be arranged to track a truncate object in a truncate link for each file. The truncate link may comprise information such as the address of truncate object in the nonvolatile memory 102, the operation number, and the truncate length, for example.

In various embodiments, the DLT 112 may be arranged to track valid information for each file in data links. The valid information may comprise, for example, valid data fragments or valid portions of data fragments for a data file. Each data link may comprise information such as original data address, current data address, operation number, type, original size, current size, and file offset, for example. The size field of a data link may be updated in the DLT 112 to indicate a partially valid data fragment. In various implementations, when a data fragment or portion of a data fragment is invalidated in the nonvolatile memory 102 by a truncate operation, the invalidated data is not treated as being a valid part of the data file and is not tracked in the DLT 112. If a data fragment is found in the nonvolatile memory 102 but is not found in the DLT 112, the data may be considered invalid and marked for reclaim.

In various embodiments, the DLT 112 may be arranged to keep an invalid byte count for each file. The invalid byte count may track data invalidated by a truncate operation or by any edits to the file. As data for a file is invalidated, the invalid byte count in the DLT 112 may be incremented to track the size of the invalidated data. In various implementations, the invalid byte count may indicate when to reclaim a truncate object from the nonvolatile memory 102. As invalid data is removed by a reclaim operation, the invalid byte count in the DLT 112 may be decremented. When the invalid byte count reaches zero, a truncate object in the nonvolatile memory block 102 may be marked as dirty space and may be removed by a reclaim operation.

The PBT 114 may be arranged to track used space in the nonvolatile memory 102. In various embodiments, the PBT 114 may update space usage variables as data is written to the nonvolatile memory block 106. In various implementations, valid data and invalid data are tracked as part of used space. As data is invalidated by a truncate operation, for example, the invalid data amount for the block increases in the PBT 114. Invalid data is tracked to help reclaim detect which blocks to erase faster and, subsequently, to decrease the invalid byte counter quicker. This avoids the need to perform a costly search of the DLT 112 to determine which block to reclaim.

Referring to the embodiment of FIG. 1, when a truncate object is written to the nonvolatile memory block 106, the truncate object is tracked in the DLT 112 of the volatile memory 110. The DLT 112 includes a truncate link to track the truncate object including the operation number (Operation #3) and the truncate length (50 bytes). The DLT 112 also includes a data link to track the valid data fragment (Data1) including the operation number (Operation #1) and the size (50 bytes). The data fragment (Data2) invalidated by the truncate operation, however, is not tracked in the DLT 112. The DLT 112 may increment an invalid byte count to 25 bytes. The PBT 114 may indicate that the nonvolatile memory block 106 has 75 bytes of used space consumed by valid data.

In various implementations, multiple truncate operations may be performed on a given data file. Tracking all the truncate objects in the volatile memory 110, however, can be costly in terms of memory usage and speed. In various embodiments, the volatile memory 110 may be arranged to optimize the tracking of truncate operations by tracking only the most recent truncate operation for a given data file. By tracking only the most recent truncate information, any number of truncate operations on a given data file may be supported while conserving space in the nonvolatile memory 102 and the volatile memory 110.

If a subsequent truncate operation is performed on the data file, any data exceeding the truncate length specified by the subsequent truncate operation will be invalidated. In this case, the subsequent truncate operation will have a higher operation number than any other data in the file including the prior truncate object. In some cases, one or more additional data writes can occur before the subsequent truncate operation on the file. The additional data writes will have a higher operation number than any data or truncate object previously written to the data file. If a subsequent truncate operation occurs after the additional data writes, all operation numbers will be ascending and the prior truncate object is not needed.

Whenever a subsequent truncate operation occurs on a data file, the prior truncate object is no longer tracked in the DLT 112. As such, space in the volatile memory 110 may be saved since only one truncate operation needs to be tracked at any given time. In addition, the invalid byte count in the DLT 112 that tracks invalid data for the data file ensures that the most recent truncate object is retained in the nonvolatile memory 102 only until all invalid data for a data file has been removed. Any subsequent truncates increase the invalid byte count tracked by the DLT 112 to ensure that the most recent truncate is not removed until all invalidated data due to the current truncate or previous truncates are removed. This is allowed to take place because it can be realized that the most recent truncate will either be at a file offset before the previous truncate or more recent writes will have taken place such that any previously truncated data not covered by the current offset of the truncate file will still not be valid.

When the invalid byte count reaches zero, the prior truncate object in the nonvolatile memory block 106 may be marked for reclaim to allow memory space in the nonvolatile memory 102 to be recovered once reclaim takes place. As such, space in the nonvolatile memory 102 may be saved by keeping a truncate object only until all invalid data has been reclaimed.

In various implementations, tracking a truncate object may be performed to satisfy PLR requirements in the event power is lost or interrupted. In general, upon power up, all data may appear valid. When a truncate operation has been performed, however, some data has been invalidated. Upon power up, the nonvolatile memory 102 may be scanned and the DLT 112 and the PBT 114 may be reconstructed with valid data. As such, the latest truncate object tracked in the DLT 112 may allow a data file to be correctly reconstructed when power is reestablished.

In various embodiments, the nonvolatile memory 102 may enforce a sequential addressing requirement that restricts the ability to go back to previously programmed areas of the nonvolatile memory 102. In such embodiments, it may not be possible to go back to previous regions of the reclaim nonvolatile memory block 106 to record reclaim states. As described above, however, the truncate operation reduces the file size by invalidating some of the data of the data file while complying with sequential addressing restrictions and/or restrictions against bit-twiddling.

In various implementations, the truncate operation may be performed on a given data file to decrease the file size while following sequential addressing restrictions and only tracking the latest truncate operation for the given file. The truncate is able to do so because it stores the truncate offset as well as the operation number within the truncate object itself in the nonvolatile memory. Using this truncate file offset along with all the operation numbers included on all writes and truncates, the portions of a file that have been truncated can be tracked, even in cases of power-loss.

The nonvolatile memory 102 may perform the truncate operations using hardware, software, and/or any combination thereof, as desired for a given set of design parameters or performance constraints. In various embodiments, the nonvolatile memory 102 may be arranged to perform the truncate operations using a controller 116 and/or a truncate block 118. The controller 116 may comprise, for example, a microcontroller embedded in or integrated with the nonvolatile memory 102, and the nonvolatile memory 102 may comprise instructions and/or code to be executed by the controller 116.

It can be appreciated that although some embodiments may be described with the controller 116 implemented by a microcontroller, the embodiments are not limited in this context. For example, in some embodiments, the controller 116 may be implemented by a processor such as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor, and so forth. The controller 116 also may be implemented by an application specific integrated circuit (ASIC), a field programmable gate array (FPGA), a programmable logic device (PLD), and so forth.

In various embodiments, the nonvolatile memory 102 may comprise a truncate module 118. The truncate module 118 may be implemented, for example, by hardware and/or software in the nonvolatile memory 102. The truncate module 118 may comprise, for example, instructions and/or code in the nonvolatile memory 102 to be executed by the controller 116. In various implementations, the truncate module 118 may comprise logic for truncating data files in the nonvolatile memory 102.

In various embodiments, the truncate module 118 may comprise part of a file system manager 120 of the nonvolatile memory 102. The file system manager 120 may be implemented, for example, by instructions and/or code stored in the nonvolatile memory 102. In various embodiments, the file system manager 120 may comprise logic to manage and store information in the nonvolatile memory 102. The file system manager 120 may be arranged to issue read, write, and erase commands for the nonvolatile memory 102 and to translate file system volumes into memory arrays. In various implementations, the file system manager 120 may provide one or more interfaces between the hardware of the nonvolatile memory 102 and a client application and/or an operating system (OS), such as a real-time operating system (RTOS).

In various embodiments, the file system manager 120 may comprise instructions and/or code to be executed by the controller 116. In some embodiments, the controller 116 may be arranged to perform various operations for managing and storing information in the nonvolatile memory 102. The operations performed by the controller 116 may comprise, for example, standard operations such as read, program, and erase operations. The controller 116 also may be arranged to perform operations to increase and/or optimize system performance. For example, the controller 116 may allow some operations to be performed simultaneously, such as reading and executing code while programming data. The controller 116 also may allow some operations to be suspended and resumed. The controller 116 may perform various operations in one or more modes such as an asynchronous mode, synchronous mode, word mode, page mode, and burst mode, for example.

In various embodiments, the file system manager 120 may comprise a reclaim module 122. The reclaim module 122 may be implemented, for example, by hardware and/or software in the nonvolatile memory 102. The reclaim module 122 may comprise, for example, instructions and/or code to be executed by the controller 116. In various implementations, the reclaim module 122 may comprise logic for reclaiming space in the nonvolatile memory 102.

In various embodiments, the nonvolatile memory 102 may be arranged to receive information from a processor 124, such as a central processing unit (CPU), for example. In various embodiments, the controller 116 may perform one or more operations in the nonvolatile memory 102 in response to information received from the processor 124. As shown, the processor 124 may comprise a discrete component separate from and coupled to the nonvolatile memory 102. In various implementations, the nonvolatile memory 102 may store instructions and/or code to be executed by the processor 124.

The processor 124 generally may be implemented using any processor or logic device. In various embodiments, the processor 124 may be implemented as a general purpose processor, a CMP, a dedicated processor, an embedded processor, a DSP, a network processor, a media processor, an I/O processor, a MAC processor, a radio baseband processor, a co-processor, a microprocessor, a controller, a microcontroller, an ASIC, a FPGA, a PLD, and so forth. In various implementations, the processor 124 may include at least one core comprising, for example, an arithmetic-logic unit (ALU) and a number of registers. The core may be arranged to execute digital logic and may provide for multiple threads of execution.

In various embodiments, the nonvolatile memory 102 may be arranged to receive information over one or more communications media 126. The communications media 126 generally may comprise any medium capable of carrying information signals such as wired communication media, wireless communication media, or a combination of both, as desired for a given implementation. The communications media 126 may comprise, for example, wired communication media such as a bus to interconnect various functional units of the computing system 100. Other examples of wired communications media may include a wire, a cable, a printed circuit board (PCB), a backplane, a switch fabric, semiconductor material, twisted-pair wire, co-axial cable, fiber optics, and so forth. An example of wireless communication media may include portions of a wireless spectrum, such as the radio-frequency (RF) spectrum. The embodiments are not limited in this context.

In various implementations, the received information may be segmented into a series of data packets. Each data packet may comprise, for example, a discrete data set having a fixed or varying size represented in terms of bits or bytes, such as 1 KB. It can be appreciated that the described embodiments are applicable to any type of content or format, such as packets, windows, files, cells, frames, fragments, units, and so forth.

In various embodiments, the nonvolatile memory 102 may be arranged to receive information through a communications interface 128. The communications interface 128 may comprises any suitable hardware, software, or combination of hardware and software that is capable of coupling the computing system 100 to one or more networks and/or network devices. The communications interface 128 may be arranged to operate with any suitable technique for controlling information signals using a desired set of communications protocols, services or operating procedures. The communications interface 128 may include the appropriate physical connectors to connect with a corresponding communications medium.

In various embodiments, the communications interface 128 may comprise one or more interfaces such as, for example, a wireless communications interface, a wired communications interface, a network interface, a transmit interface, a receive interface, a media interface, a system interface, a component interface, a switching interface, a chip interface, a controller (e.g., disc controller, video controller, audio controller), and so forth. When implemented by a wireless device or wireless system, for example, the computing system 100 may include a wireless interface comprising one or more antennas, transmitters, receivers, transceivers, amplifiers, filters, control logic, and so forth.

FIGS. 2A-D illustrate one embodiment of a memory system 200. In various embodiments, the memory system 200 may be implemented by the computing system 100 of FIG. 1. The embodiments, however, are not limited in this context.

As shown, the memory system 200 may comprise truncate logic 202 for performing truncate operations to reduce the size of a data file. In various embodiments, the truncate logic 202 may be implemented as hardware, software, and/or any combination thereof, as desired for a given set of design parameters or performance constraints. For example, the truncate logic 202 may be implemented by a logic device (e.g., controller 116) and/or module (e.g., truncate module 118) comprising instructions and/or code to be executed by a logic device.

The memory system 200 may comprise a nonvolatile memory 204 to implement a file system. As shown, the nonvolatile memory 204 may comprise a nonvolatile memory block 206 including regions 208-1-n, where n represents any positive integer value (e.g., n=256).

The memory system 200 may comprise a volatile memory 210 implemented as RAM, for example. As shown, the volatile memory 210 may comprise a DLT 212 to store information associated with one or more truncate operations. In various embodiments, when a truncate object is written to the nonvolatile memory 204, the truncate object is tracked in the DLT 212 of the volatile memory 210. In such embodiments, the DLT 212 may be arranged to track a truncate object in a truncate link for each file.

The DLT 212 also may be arranged to track valid information for each file in data links. The valid information may comprise, for example, valid data fragments or valid portions of data fragments for a data file. In various implementations, when a data fragment or portion of a data fragment is invalidated in the nonvolatile memory 204 by a truncate operation, the invalidated data is not treated as being a valid part of the data file and is not tracked in the DLT 212.

Figure 2A:
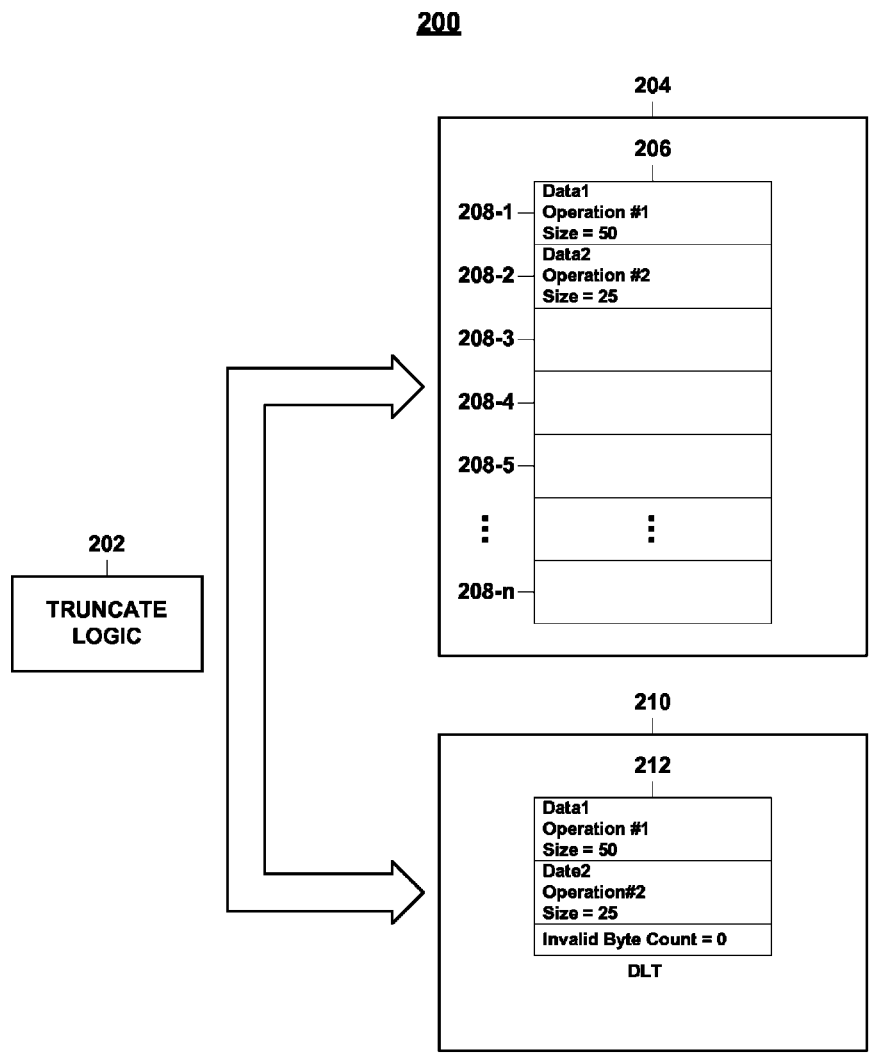
FIGS. 2A-D illustrate one embodiment of a memory system.

Referring to FIG. 2A, a first data fragment (Data1) having a size of 50 bytes is written to a first region 208-1 of the nonvolatile memory block 206 by a first operation (Operation #1). A second data fragment (Data2) having a size of 25 bytes is written to a second region 208-2 of the nonvolatile memory block 206 by a second operation (Operation #2). As shown, the DLT 212 includes a data link to track the valid data (Data1) including the operation number (Operation #1) and the size (50 bytes). The DLT 212 also includes a data link to track the valid data fragment (Data2) including the operation number (Operation #2) and the size (25 bytes). The DLT 212 includes an invalid byte count of 0 bytes.

Figure 2B:
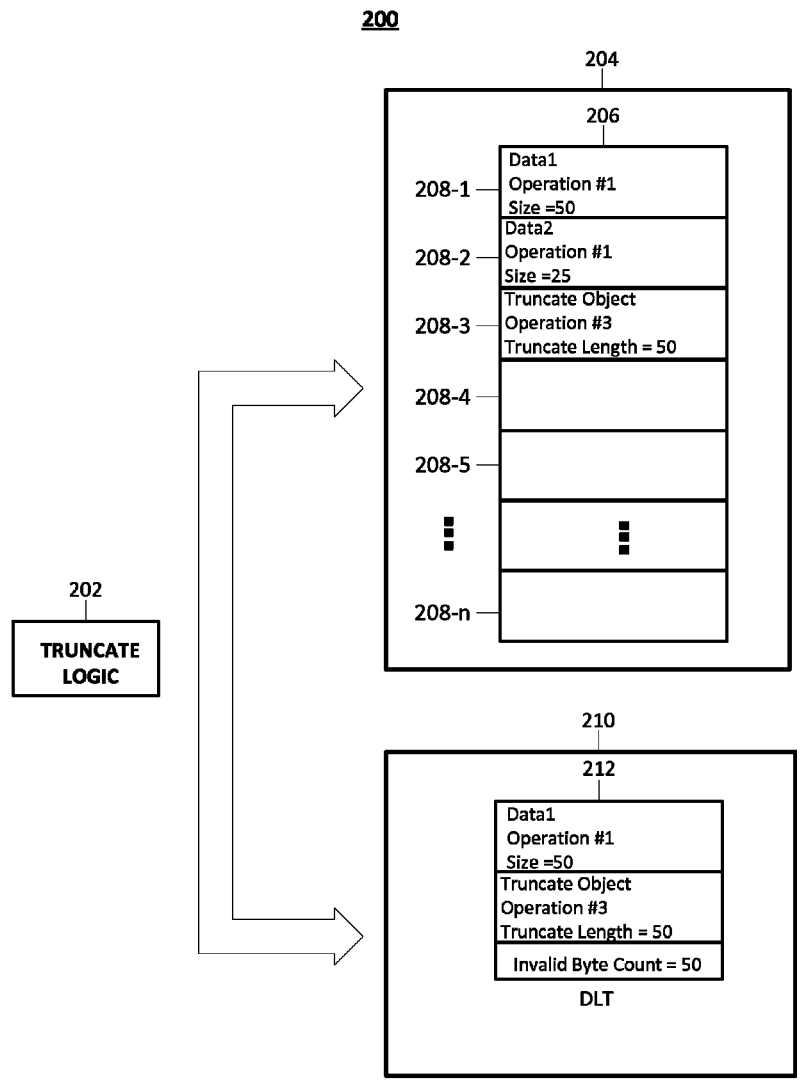

Referring to FIG. 2B, a truncate object to reduce the file size to 50 bytes is written to the third region 208-3 of the nonvolatile memory block 206 by a third operation (Operation #3). The second data fragment (Data2) may be invalidated by the truncate operation but not yet reclaimed. As shown, the DLT 212 includes a data link to track the valid data (Data1) including the operation number (Operation #1) and the size (50 bytes). The data fragment (Data2) invalidated by the truncate operation, however, is not tracked in the DLT 212. The DLT 212 includes a truncate link to track the truncate object including the operation number (Operation #3) and the truncate length (50 bytes). The DLT 212 includes an invalid byte incremented to 50 bytes.

Figure 2C:
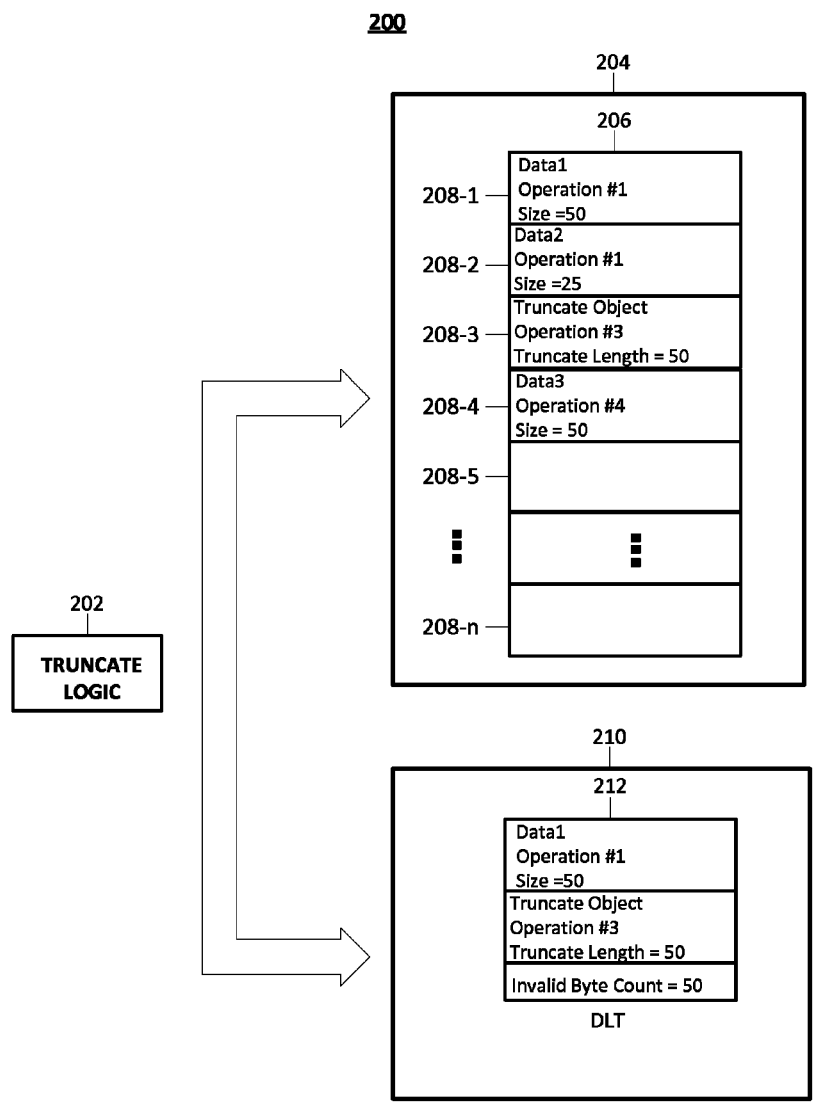

Referring to FIG. 2C, a third data fragment (Data3) having a size of 50 bytes is written to a fourth region 208-4 of the nonvolatile memory block 206 by a fourth operation (Operation #4). As shown, the DLT 212 includes a data link to track the valid data (Data1) including the operation number (Operation #1) and the size (50 bytes). The data fragment (Data2) invalidated by the truncate operation is not tracked in the DLT 212. The DLT 212 includes a truncate link to track the truncate object including the operation number (Operation #3) and the truncate length (50 bytes). The DLT 212 includes a data link to track the valid data (Data3) including the operation number (Operation #4) and the size (50 bytes). The DLT 212 includes an invalid byte of 50 bytes.

Figure 2D:
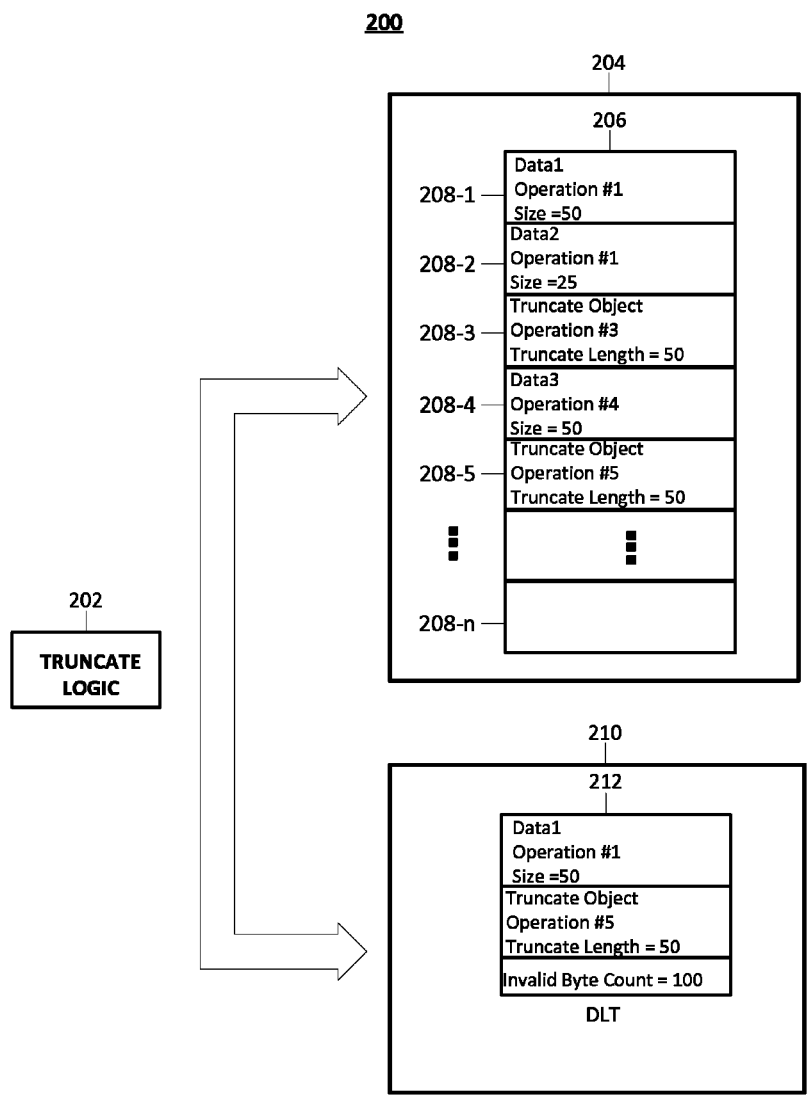

Referring to FIG. 2D, a second truncate object to reduce the file size to 50 bytes is written to the fifth region 208-5 of the nonvolatile memory block 206 by a fifth operation (Operation #5). The third data fragment (Data3) may be invalidated by the truncate operation but not yet reclaimed. The first truncate object also may be invalidated by the second truncate object but may still be present in the nonvolatile memory block 206 if not yet reclaimed. As shown, the DLT 212 includes a data link to track the valid data (Data1) including the operation number (Operation #1) and the size (50 bytes). The second data fragment (Data2) invalidated by the first truncate operation is not tracked in the DLT 212. The third data fragment (Data3) invalidated by the second truncate operation is not tracked in the DLT 212. The DLT 212 includes a truncate link to track the second truncate object including the operation number (Operation #5) and the truncate length (50 bytes). The first truncate object, however, is no longer tracked in the DLT 212. The DLT 212 includes an invalid byte incremented to 100 bytes.

In various embodiments, the DLT 212 may keep an invalid byte count to track the invalidated data for the data file. The invalid byte count may be incremented as data is invalidate and decremented as invalid data is reclaimed. After all the invalid data for the file has been removed, the invalid byte count may reach zero indicating that the second truncate object may be reclaimed from the nonvolatile memory 204.

In various implementations, the described embodiments are not exclusive to a single flash type but work for both NOR and NAND flash devices. In such implementations, the described embodiments may provide efficient truncate operations for both NAND and NOR flash devices requiring sequential addressing. Because the truncate operations are performed without the need to go back to previous regions or to perform bit-twiddling, the truncate operations are less restrictive and more adaptive to future nonvolatile memory devices. In addition, the truncate operations may be performed using less code while maintaining a high level of performance by optimizing speed and memory usage, for example.

In various implementations, the described embodiments allow truncate operations to be performed while avoiding the need to copy all the valid data for every truncate operation and the need to run excessive reclaim operations. Copying all the valid data for every truncate operation to another location is inefficient in terms of speed and memory usage because it would require reading all the valid data, storing it in a buffer, and then writing it over. In addition, copying all the valid data for every truncate operation would create more dirty space, which would require reclaim operations to be run more frequently and hurt performance especially in the case of very large data files.

In various implementations, the described embodiments allow truncate operations to be performed while avoiding the need to run a reclaim operation on the invalid portion of a data file for every truncate operation. Running excessive reclaim operations hurt performance because time is spent in read, write, and erase cycles, which can be very costly in a usage model with frequent truncate operations. The ability to perform multiple truncate operations on a data file while only tracking the latest truncate object reduces the overhead involved in tracking all the truncate operations that occur for a given data file.

Operations for various embodiments may be further described with reference to the following figures and accompanying examples. Some of the figures may include a logic flow. It can be appreciated that the logic flow merely provides one example of how the described functionality may be implemented. Further, the given logic flow does not necessarily have to be executed in the order presented unless otherwise indicated. In addition, the logic flow may be implemented by a hardware element, a software element executed by a processor, or any combination thereof. The embodiments are not limited in this context.

Figure 3:
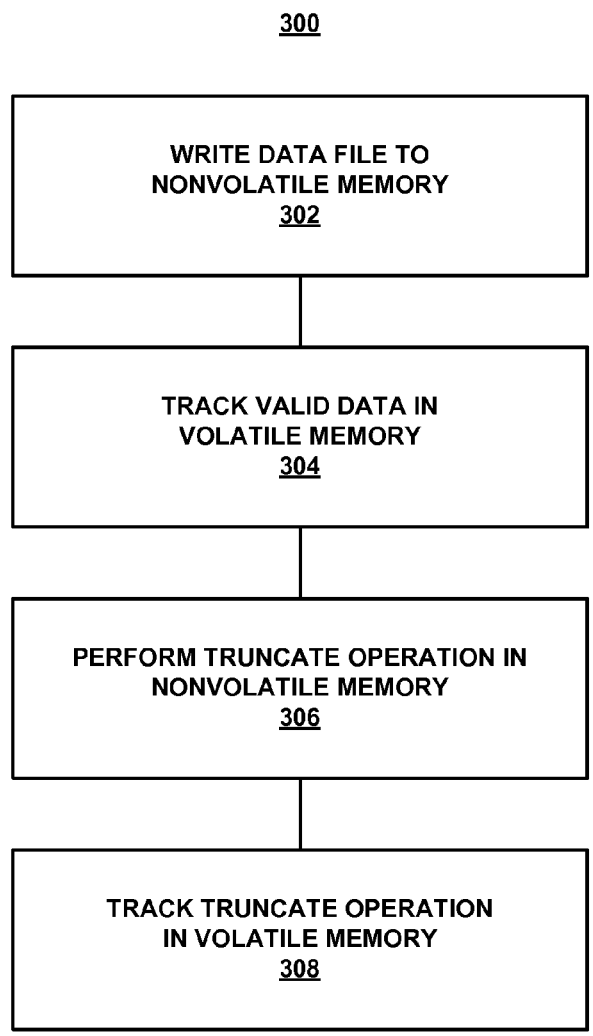
FIG. 3 illustrates one embodiment of a logic flow.

FIG. 3 illustrates one embodiment of a logic flow 300. FIG. 3 illustrates logic flow 300 for performing truncate operations to reduce the size of a data file. In various embodiments, the logic flow 300 may be implemented by one or more elements of the computing a system 100 of FIG. 1 and/or the memory system 200 of FIGS. 2A-D. It can be appreciated that the logic flow 300 may be implemented by various other types of hardware, software, and/or combination thereof.

At block 302, the logic flow 300 may comprise writing a data file to a nonvolatile memory, such as a NAND or NOR flash memory. In various embodiments, the data file may be divided into data fragments and written to the nonvolatile memory.

At block 304, the logic flow 300 may comprise tracking valid data in a volatile memory, such as RAM. The valid data may be tracked, for example, by a data link in a DLT within the volatile memory. In various embodiments, the volatile memory may track space usage of the nonvolatile memory in a PBT.

At block 306, the logic flow 300 may comprise performing one or more truncate operations in the nonvolatile memory to reduce the size of the data file. In various embodiments, performing a truncate operation may comprise writing a truncate object to the nonvolatile memory.

At block 308, the logic flow 300 may comprise tracking a truncate operation in the volatile memory. The truncate operation may be tracked, for example, by a truncate link in a DLT within the volatile memory. In various embodiments, only the most recent truncate operation is tracked in the volatile memory. In various implementations, the volatile memory may keep an invalid byte count in the DLT to track invalidated data. The invalid byte count may be incremented as data in the nonvolatile memory is invalidated and decremented as invalidated data is reclaimed. When the invalid byte count reaches zero, a truncate object in the nonvolatile memory may be reclaimed.

It can be appreciated that as truncate operations are performed and tracked, previous areas of the nonvolatile memory are not revisited and writes to the nonvolatile memory comply with sequential addressing restrictions and avoid bit-twiddling. It also can be appreciated that during PLR operations, a file system is able to recover by tracking only the most recent truncate operation.

In various implementations, the described embodiments may comprise, or form part of a wired communication system, a wireless communication system, or a combination of both. Although certain embodiments may be illustrated using a particular communications media by way of example, it may be appreciated that the principles and techniques discussed herein may be implemented using various communication media and accompanying technology.

In various implementations, the described embodiments may comprise or form part of a network, such as a Wide Area Network (WAN), a Local Area Network (LAN), a Metropolitan Area Network (MAN), a wireless WAN (WWAN), a wireless LAN (WLAN), a wireless MAN (WMAN), a wireless personal area network (WPAN), a WiMAX network, a broadband wireless access (BWA) network, the Internet, the World Wide Web, a telephone network, a radio network, a television network, a cable network, a satellite network, a Code Division Multiple Access (CDMA) network, a third generation (3G) network such as Wide-band CDMA (WCDMA), a fourth generation (4G) network, a Time Division Multiple Access (TDMA) network, an Extended-TDMA (E-TDMA) cellular radiotelephone network, a Global System for Mobile Communications (GSM) network, a Synchronous Division Multiple Access (SDMA) network, a Time Division Synchronous CDMA (TD-SCDMA) network, an Orthogonal Frequency Division Multiplexing (OFDM) network, an Orthogonal Frequency Division Multiple Access (OFDMA) network, a North American Digital Cellular (NADC) cellular radiotelephone network, a Narrowband Advanced Mobile Phone Service (NAMPS) network, a Universal Mobile Telephone System (UMTS) network, and/or any other wired or wireless communications network configured to carry data. The embodiments are not limited in this context.

In various implementations, the described embodiments may be arranged to communicate using a number of different WWAN data communication services. Examples of cellular data communication systems offering WWAN data communication services may include a GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HS-DPA) systems, and so forth.

In various implementations, the described embodiments may be arranged to communicate in accordance with a number of wireless protocols. Examples of wireless protocols may include various WLAN protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various WWAN protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may include WPAN protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electro-magnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and other protocols.

In various implementations, the described embodiments may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD or DSP, and so forth. In yet another example, an embodiment may be implemented by any combination of programmed general-purpose computer components and custom hardware components.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method comprising:
   performing one or more truncate operations to invalidate a first portion of a data file written to a nonvolatile memory, the nonvolatile memory configured to enforce a sequential addressing requirement during the one or more truncate operations;
   storing information associated with the one or more truncate operations in a data structure maintained in a volatile memory, the data structure arranged to store information from only a most recent truncate operation for the data file from among the one or more truncate operations; and
   tracking valid data of the data file written to the nonvolatile memory using only the information for the most recent truncate operation stored in the data structure.

2. The method of claim 1, comprising performing the one or more truncate operations by causing a first truncate object to be written to the nonvolatile memory after a first truncate operation, the first truncate object including a file identification for the data file, an object type for the data file, a first operation number for the data file or a truncate length to indicate a length of the data file after the first truncate operation.

3. The method of claim 2, the first truncate operation comprising the most recent truncate operation, the data structure maintained in the volatile memory arranged to store information from the first truncate operation to include a first truncate link that identifies an address in the nonvolatile memory where the first truncate object was written to, the first operation number for the data file or the length of the data file after the first truncate operation.

4. The method of claim 3, comprising using only the information from the first truncate operation to track valid data of the data file following the first truncate operation, the data structure maintained in the volatile memory arranged to store information from the first truncate operation to include a first data link that identifies one or more addresses in the nonvolatile memory for a second portion of the data file having valid data after the first truncate operation, a second operation number for the data file or a size of the valid data included in the second portion of the data file.

5. The method of claim 4, comprising the data structure also arranged to maintain an invalid byte count indicating an amount of data included in the first portion of the data file that was invalidated by the one or more truncate operations.

6. The method of claim 5, comprising reclaiming one or more portions of the nonvolatile memory storing the invalidated data included in the first portion of the data file and updating the invalid byte count maintained in the data structure responsive to the reclaiming of the one or more portions of the nonvolatile memory.

7. The method of claim 6, comprising:
reclaiming the portions of the nonvolatile memory storing the invalidated data included in the first portion of the data file;
updating the invalid byte count to indicate zero bytes of invalid data; and
reclaiming the portion of the nonvolatile memory storing the first truncate object responsive to the indication of zero bytes of invalid data.

8. The method of claim 1, the nonvolatile memory comprising at least one of a NAND flash memory, NOR flash memory, polymer memory, ferroelectric memory or magnetic memory.

9. An apparatus comprising:
non-volatile memory;
a controller for the non-volatile memory; and
a truncate module, executed by the controller, to perform one or more truncate operations to invalidate a first portion of a data file written to the nonvolatile memory, the nonvolatile memory configured to enforce a sequential addressing requirement during the one or more truncate operations, the truncate module to also cause information associated with the one or more truncate operations to be stored in a data structure maintained in a volatile memory, the data structure arranged to store information from only a most recent truncate operation for the data file from among the one or more truncate operations, the truncate module to use only the information for the most recent truncate operation to track valid data of the data file written to the nonvolatile memory.

10. The apparatus of claim 9, the truncate module to perform one or more truncate operations comprising the truncate module to cause a first truncate object to be written to the nonvolatile memory after a first truncate operation, the first truncate object to include a file identification for the data file, an object type for the data file, a first operation number for the data file or a truncate length to indicate a length of the data file after the first truncate operation.

11. The apparatus of claim 10, the first truncate operation comprising the most recent truncate operation, the data structure maintained in the volatile memory arranged to store information from the first truncate operation to include a first truncate link that identifies an address in the nonvolatile memory where the first truncate object was written to, the first operation number for the data file or the length of the data file after the first truncate operation.

12. The apparatus of claim 11, comprising the truncate module to use only information from the first truncate operation to track valid data of the data file following the first truncate operation, the data structure maintained in the volatile memory arranged to store information from the first truncate operation to include a first data link that identifies one or more addresses in the nonvolatile memory for a second portion of the data file having valid data after the first truncate operation, a second operation number for the data file or a size of the valid data included in the second portion of the data file.

13. The apparatus of claim 12, comprising the data structure also arranged to maintain an invalid byte count indicating an amount of data included in the first portion of the data file that was invalidated by the one or more truncate operations.

14. The apparatus of claim 13, comprising a reclaim module, executed by the controller, to reclaim one or more portions of the nonvolatile memory storing the invalidated data included in the first portion of the data file, the truncate module to update the invalid byte count maintained in the data structure responsive to the reclaiming of the one or more portions of the nonvolatile memory by the reclaim module.

15. The apparatus of claim 14, comprising the reclaim module to reclaim the portions of the nonvolatile memory storing the invalidated data included in the first portion of the data file, the truncate module to update the invalid byte count to indicate zero bytes of invalid data, the reclaim module to reclaim the portion of the nonvolatile memory storing the first truncate object responsive to the indication of zero bytes of invalid data.

16. The apparatus of claim 9, the nonvolatile memory comprising at least one of a NAND flash memory, NOR flash memory, polymer memory, ferroelectric memory or magnetic memory.

17. A system comprising:
a wireless interface having an antenna;
a volatile memory;
a nonvolatile memory having a controller coupled to the wireless interface and a nonvolatile memory array configured to enforce a sequential addressing requirement, the controller to execute a truncate module arranged to perform one or more truncate operations to invalidate a first portion of a data file written to the nonvolatile memory array, the truncate module also arranged to cause information associated with the one or more truncate operations to be stored in a data structure maintained in the volatile memory, the data structure arranged to store information from only a most recent truncate operation for the data file from among the one or more truncate operations, the truncate module to use only information for the most recent truncate operation to track valid data of the data file written to the nonvolatile memory array.

18. The system of claim 17, the truncate module to perform one or more truncate operations comprising the truncate module to cause a first truncate object to be written to the nonvolatile memory array after a first truncate operation, the first truncate object to include a file identification for the data file, an object type for the data file, a first operation number for the data file or a truncate length to indicate a length of the data file after the first truncate operation.

19. The system of claim 18, the first truncate operation comprising the most recent truncate operation, the data structure maintained in the volatile memory arranged to store information from the first truncate operation to include a first truncate link that identifies an address in the nonvolatile memory array where the first truncate object was written to, the first operation number for the data file or the length of the data file after the first truncate operation, the truncate module to use only information from the first truncate operation to track valid data of the data file following the first truncate operation, the data structure maintained in the volatile memory arranged to store information from the first truncate operation to include a first data link that identifies one or more addresses in the nonvolatile memory for a second portion of the data file having valid data after the first truncate operation, a second operation number for the data file or a size of the valid data included in the second portion of the data file.

20. The system of claim 17, the nonvolatile memory array comprising at least one of a NAND flash memory array, a NOR flash memory array, a polymer memory array, a ferroelectric memory array or magnetic memory array.

* * * * *